Aug. 30, 1960     F. D. COVELY 3RD., ET AL     2,951,236
SWITCHING SYSTEM

Filed May 10, 1954     4 Sheets-Sheet 1

INVENTORS:
FRANK D. COVELY, III
& ARTHUR C. STOCKER
BY Charles H. Brown
ATTORNEY INVENTORS
FRANK D. COVELY, III
& ARTHUR C. STOCKER
BY Charles H. Brown
ATTORNEY

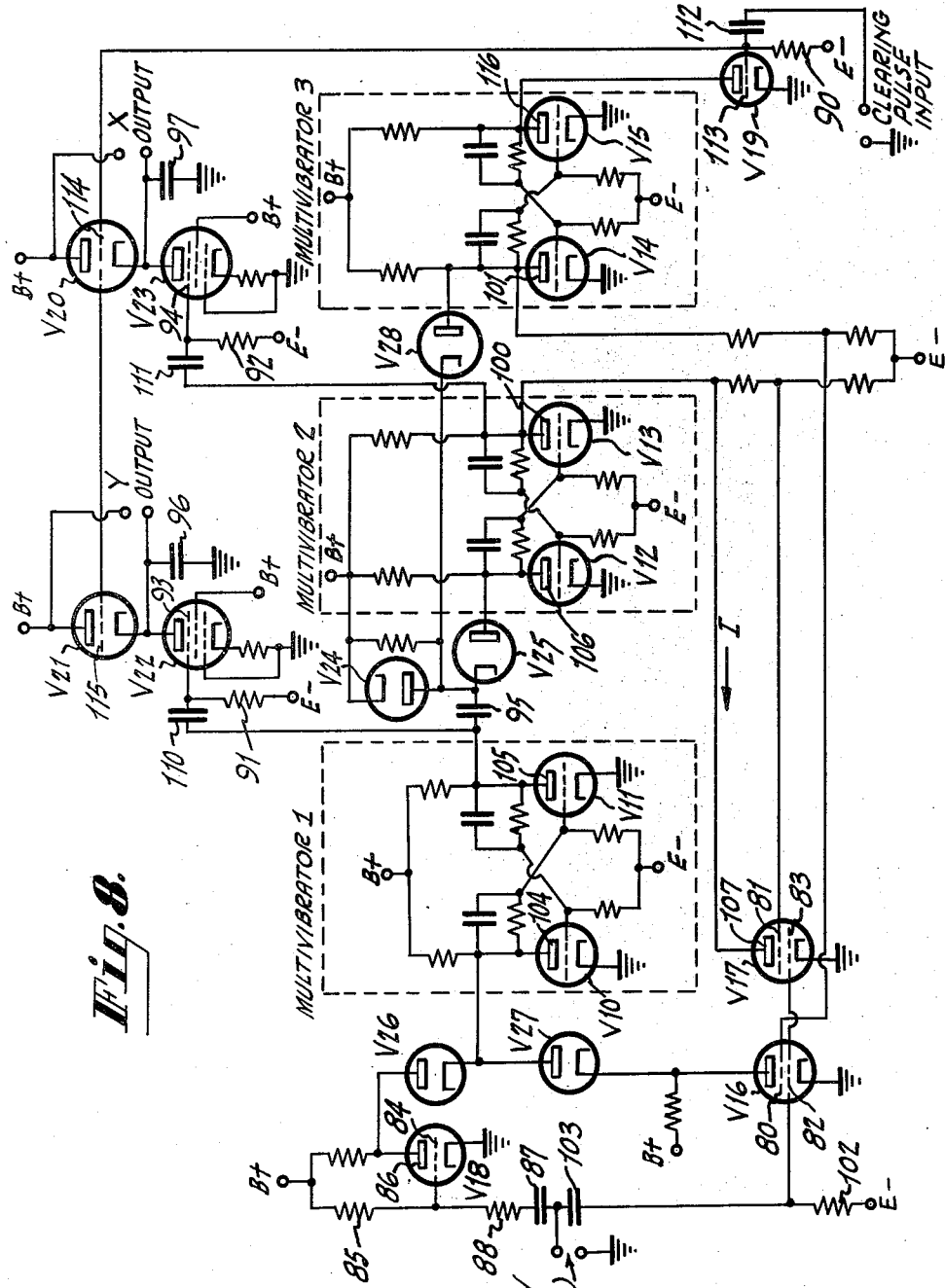

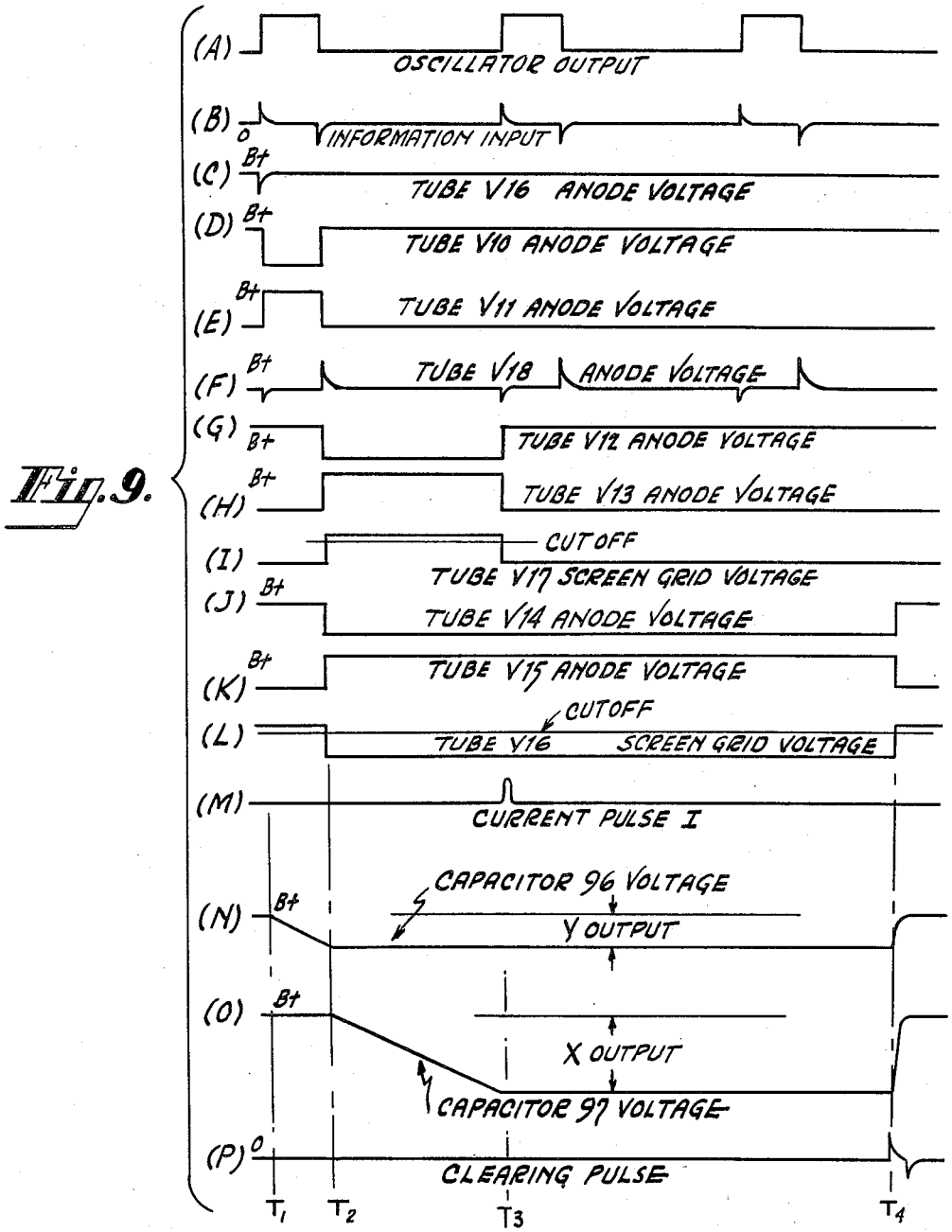

United States Patent Office 2,951,236
Patented Aug. 30, 1960

2,951,236

SWITCHING SYSTEM

Frank D. Covely 3rd, Haddonfield, and Arthur C. Stocker, Collingswood, N.J., assignors to Radio Corporation of America, a corporation of Delaware Filed May 10, 1954, Ser. No. 428,646

19 Claims. (Cl. 340—174.1)

The invention relates to information handling systems, and particularly to a system for sequentially switching a plurality of signals into a common load without the use of wiping contacts.

In a system such as an automatic tracking radar system, it is necessary that separate stores of information be sampled and fed into a common load such as synthetic display equipment. It is also necessary that the separate stores be sampled rapidly, repetitively, and for sustained periods of time. When mechanical means, such as a rotary switch with contacts, is used under such conditions, frequent breakdowns occur. As a practical example, there is no mechanical switch on the market that can make 1000 contacts per second and give more than one hundred hours of trouble-free operation. Furthermore, the fabrication of such a a mechanical switch requires such precision that the cost becomes important. Frequent maintenance and repair are required, thus decreasing the usefulness and increasing the operational cost of such systems.

It is an object of the invention to provide an improved information handling system that is capable of high speed operation for long periods of time, that has no wiping contacts, that has a minimum number of moving mechanical parts, that requires a minimum of maintenance, and that is capable of sampling a large number of information stores without requiring a large number of associated circuits.

The objects of the invention are attained by recording the stored information on the edge of a disk, the information from each store being recorded at a different place, and by rotating the disk so that the recorded information is read off in turn, thereby producing the effect of switching. This type of system is already known in the art. The invention offers a new and improved system for preparing the stored information for recording, and new and improved means for restoring the recorded information to a more useful form.

According to the invention, each information store represents the information by a positive D.-C. voltage having a magnitude that is proportional to the magnitude of the information. These D.-C. voltages are applied to square-wave oscillators to control the outputs of the oscillators, which may be rectangular as well as square waves. The information is represented in the output waves by the time durations of the upper and lower portions of the output waves. In one embodiment of the invention, where a single output wave represents one component of information, the time durations of the upper and lower portions of the output wave are equal. In the second embodiment of the invention, where a single output wave represents two components of information, the time durations of the upper portions of the output wave may differ from the time durations of the lower portions of the output wave. In either embodiment, however, the time durations of the upper and lower portions of the output waves represent the information and enable it to be utilized in the invention.

The oscillators that produce the square or rectangular waves are normally quiescent, and only become operative while an actuating pulse is applied to them. The wave produced by each oscillator during the actuating pulse is fed into a recording device, such as a magnetic recorder. Synchronized with the recording device is another device for producing are actuating pulse for simultaneously actuating the oscillators. This enables a large number of separate waves of information to be recorded on a single recording medium without any overlapping between the various waves being recorded. The recorded waves are picked up in succession by a pick-up head. They are then converted back to D.-C. voltages that have magnitudes proportional to the magnitudes of the original information. The converted voltages may then be utilized in any way desired.

The invention is further explained in the following description and the accompanying drawing, in which:

Fig. 8 shows the circuit for the converter used in Fig. 5; and

Fig. 9 shows the waves representing the operation of the converter of Fig. 8.

Figure 1:
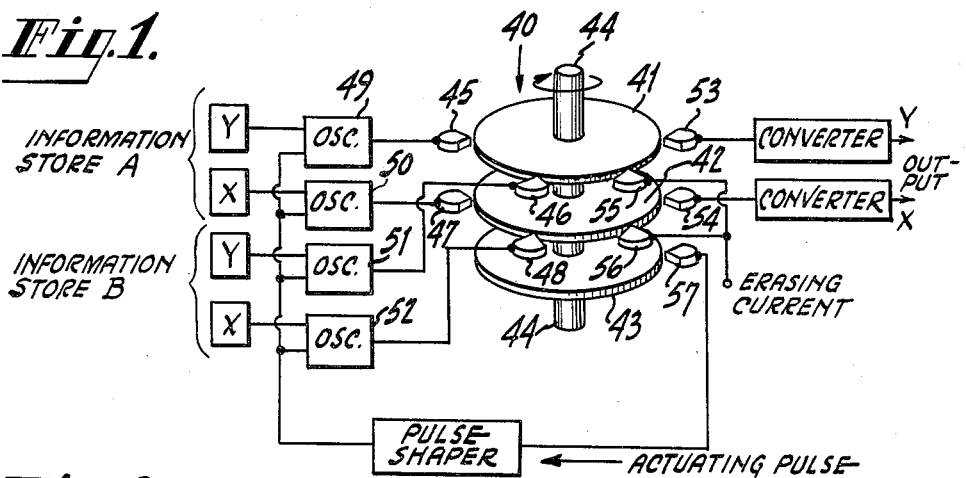
Fig. 1 shows a block diagram of one embodiment of the invention.

In Fig. 1, two information stores, A and B, are shown. While this system is capable of handling almost any number of such stores, only two are shown for clarity and simplicity. Each store presents two D.-C. voltages which represent an X and a Y component of information and each D.-C. voltage controls the output of an individual square-wave oscillator. The use of X and Y components is simply for descriptive purposes, as the system can handle any sort of information represented by a D.-C. voltage.

*The oscillator*

Figure 2:
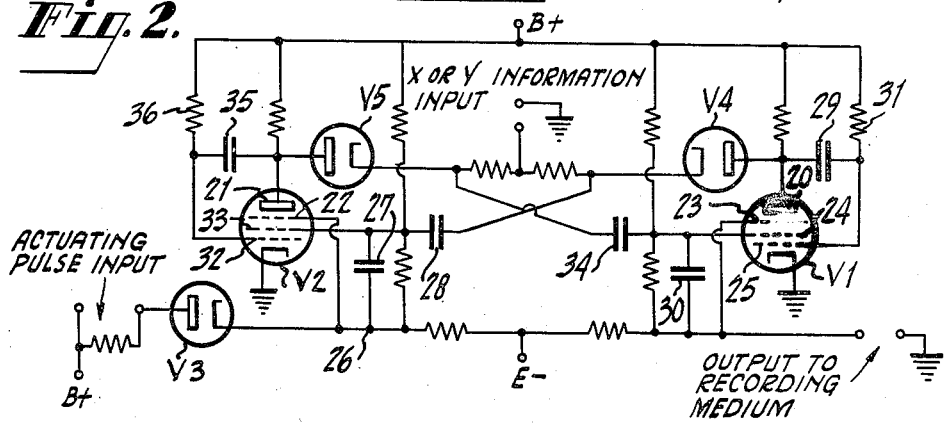
Fig. 2 shows the circuit for one of the oscillators used in Fig. 1.

The circuit for this free-running square-wave oscillator is shown in Fig. 2. The basic circuit for such an oscillator is known in the art, and is shown on page 199 of volume 19 of the "M.I.T. Radiation Laboratory Series," First Edition, published by the McGraw-Hill Book Company, Inc., of New York, in 1949. However, the basic circuit has been modified by the addition of an actuating pulse input and the diode $V_3$. Positive terminals of D.-C. voltage sources are shown as B+ and negative terminals of D.-C. voltage sources are shown as E—.

Figure 3:
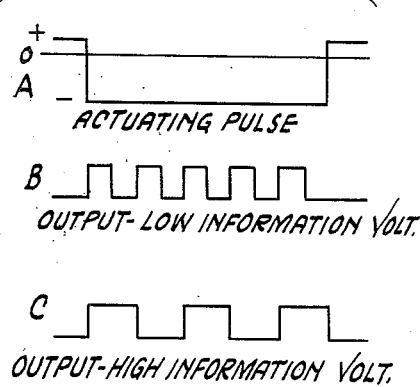
Fig. 3 shows waves representing the operation of the oscillator of Fig. 2.

In Fig. 3, several waves representing the outputs of the oscillator of Fig. 2 are shown. At all times other than during receipt of an actuating pulse, the oscillator is cut off. During receipt of an actuating pulse, however, the oscillator is free to oscillate and produce a square wave. An output for a low information voltage is shown in Fig. 3(b), and an output for a high information voltage is shown in Fig. 3(c). It will be seen that the period of each cycle of the square waves is varied in response to the information voltage.

The oscillator of Fig. 2 is designed so that the time duration of the upper portion of the output waves in Figs. 3(b) and 3(c) is controlled by the voltage on the anode 20 of the pentode $V_1$, and the time duration of the lower portion of the same output waves is controlled by the voltage on the anode 21 of the pentode $V_2$. Ideally, the transition time between the upper and lower portions of a wave is instantaneous. Actually, a finite time is required for the transition, but is very small. As long as there is a definite transition between the upper and lower portions, it makes no difference how great the transition is, or whether it is between different positive values, or different negative values, or between a positive value and a negative value. Since both of the anode voltages are determined by the voltage appearing at the X or Y information input, the upper and lower portions of the output waves have the same time duration. In this way, the magnitude of the information voltage determines the time duration or period of each cycle of the upper and lower portions of an output wave.

Prior to receiving an actuating pulse, the diode $V_3$ in Fig. 2 is conducting, hence the voltage on the suppressor grid 22 is high enough to permit anode current to flow in the pentode $V_2$. The voltage on the anode 21 is therefore very low. At the same time, the voltage on the suppressor grid 23 of the pentode $V_1$ is so negative that no anode current can flow, and the voltage on the anode 20 is limited to that value which will cause current to flow through the diode $V_4$ to the information input. That is, the quiescent anode voltage of the pentode $V_1$ is a function of the information input. The low voltage on the suppressor grid 23 also causes most of the cathode current of the pentode $V_1$ to flow to the screen grid 24. The balance of the cathode current flows to the control grid 25. When the negative actuating pulse of Fig. 3(a) is applied to the diode $V_3$, it no longer conducts. The voltage at the point 26 immediately drops, and this rapid drop in voltage produces a negative pulse which is coupled through the capacitors 27 and 28 and the diode $V_4$ to the anode 20 of the pentode $V_1$, and through the capacitor 29 to the control grid 25. The drop in voltage on the control grid 25 greatly reduces the amount of current flowing to the screen grid 24. As soon as the current flowing to the screen grid 24 is reduced, its voltage and the output voltage, coupled to the screen grid 24 by the capacitor 30, rise rapidly to their upper value. This increased voltage also appears on the suppressor grid 23, permitting anode current to flow. But as soon as anode current starts to flow, it causes a reduction in the anode voltage which is applied through the capacitor 29 to the control grid 25, where it acts to reduce the anode current. As a result, the anode voltage is permitted to fall at a rate equal to the rate at which the resistor 31 discharges the capacitor 29. This rate is relatively constant. The output voltage remains at its upper value during the time the anode 20 is conducting. As soon as the anode 20 bottoms—that is reaches its lowest value—the screen grid 24 begins to conduct more current again, and its voltage and the output voltage drop rapidly. Thus, the time duration of the upper portion of the output wave depends on the length of time required for the voltage on the anode 20 to drop from the information input voltage to its bottom voltage, which in turn depends on the X or Y information voltage being applied to the anode 20.

During this action, the negative voltage on the suppressor grid 22 of the pentode $V_2$ has cut off the anode current so that the voltage on the anode 21 has risen to a value close to that of the information input. Most of the cathode current of the pentode $V_2$ is flowing to the control grid 32 and the screen grid 33.

The rapid drop in the voltage on the screen grid 24 produces a negative pulse which is coupled through the capacitor 34 and the diode $V_5$ to the anode 21 of the pentode $V_2$, and through the capacitor 35 to the control grid 32. The drop in voltage on the control grid 32 greatly reduces the amount of current flowing to the screen grid 33, but increases the amount of current flowing to the anode 21. The voltage on the anode 21 drops at a rate which is controlled by the capacitor 35 and the resistor 36. When the voltage on the anode 21 bottoms, the screen grid 33 begins to conduct more current, and its voltage drops rapidly. As in the previous cycle of operation, this rapid voltage drop produces a pulse which is coupled to the anode 20 of the pentode $V_1$, and the cycle is repeated. From the time the anode 20 of the pentode $V_1$ bottoms to the time the anode 21 of the pentode $V_2$ bottoms, the voltage on the screen grid 24, and hence the output voltage, are at their lower value. Thus, the time duration of the lower portion of the output wave depends on the length of time required for the voltage on the anode 21 to drop from the information input voltage to its bottom voltage, which in turn depends on the X or Y information voltage being applied to the anode 21.

If the information voltage being applied is constant for the duration of the actuating pulse, the voltages appearing on the anode 21 and on the anode 20 are equal. With equal anode voltages, the time required for each plate to bottom will also be equal, hence the time durations of the upper and lower portions of the output wave will be equal.

These oscillations continue as long as the negative actuating pulse is applied to the actuating pulse input. When this pulse is removed, the voltage on the suppressor grid 22 again becomes high enough to cause anode current to flow in the pentode $V_2$ despite the coupling from the pentode $V_1$, and the oscillations stop.

*The recording device*

The outputs of the various oscillators are coupled to the recording device 40, as shown in Fig. 1. This recording device has three disks 41, 42, and 43 rigidly fastened to a common shaft 44 which rotates as shown when the device is in operation. The disks 41 and 42 are capable of having magnetic recordings made on them by their respective recording heads 45 and 46, and 47 and 48. The Y component of store A is connected to the oscillator 49, whose output is recorded by the head 45, and the X component of store A is connected to the oscillator 50, whose output is recorded by the head 47. Likewise, the Y component of store B is connected to the oscillator 51, whose output is recorded by the head 46, and the X component of store B is connected to the oscillator 52, whose output is recorded by the head 48. Thus, the Y components of both stores are recorded on the disk 41, and the X components of both stores are recorded on the disk 42, as the disks pass by the recording heads.

When an actuating pulse of predetermined duration is applied to each of the oscillators, they are turned on for the duration of that pulse. Each square wave output is recorded on either the disk 41 or the disk 42 by the recording head coupled to the oscillator. To prevent overlapping of the recorded outputs, the recording heads associated with each disk must be spaced sufficiently far apart so that no recorded output wave of any oscillator passes by the next recording head until after the oscillators are cut off by the end of the actuating pulse. For example, the oscillator 49 must be cut off before the output wave of the oscillator 51, which is recorded by the head 46 on the disk 41, passes by the head 45. Likewise, the oscillator 50 must be cut off before the output wave of the oscillator 52, which is recorded by the head 48 on the disk 42, passes by the head 47.

To record additional information, actuating pulses may be applied to each of the oscillators immediately after the information recorded by the heads 46 and 48 has passed by the heads 45 and 47 respectively. The location of the recording heads, and the length and number of actuating pulses is so adjusted that there is neither overlap of recordings nor excessive lost time between recordings.

Associated with the disks 41 and 42 are their respective pickup heads 53 and 54. These pickup heads pick up any information recorded on the disks as they pass by.

Also associated with the disks 41 and 42 are their respective erasing heads 55 and 56. These heads produce an A.-C. or a D.-C. erasing field from an erasing current so that they remove any previously recorded information from their respective disks 41 and 42 after it passes by the pickup heads 53 and 54 respectively. Thus, the cycle of applying an actuating pulse to actuate the oscillators, recording the outputs of the oscillators, picking up the recorded outputs, and erasing the recorded outputs may be repeated as often as desired.

The converter

Figure 4:
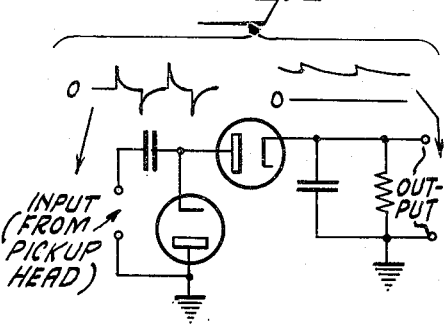
Fig. 4 shows the circuit for the converter used in Fig. 1.

Each of the pickup heads 53 and 54 is coupled to a converter whose circuit is shown in Fig. 4. The output wave, as picked up by the pickup heads, is also shown in Fig. 4. Although the outputs of the oscillators were originally square waves, as shown in Figs. 3(b) and 3(c), they become trains of pulses when recorded and picked up because of the nature of a magnetic pickup device. The converter circuit shown in Fig. 4 is well known in the art. It simply rectifies and filters the train of pulses to give the D.-C. signal shown at the output. The magnitude of this D.-C. signal depends on the number of cycles per second produced by the oscillator which in turn depends on the time durations of the upper and lower portions of the wave produced.

The actuating pulse

In the invention, one or more actuating pulses are recorded on the disk 43. This disk is fastened to the shaft 44 and rotates at the same speed as the disks 41 and 42. For each revolution of this disk 43 and by its pickup head 57, one or more actuating pulses are picked up and coupled to the actuating pulse input of each oscillator, simultaneously turning on each oscillator. The actuating pulse, as picked up, will not have the constant amplitude or the exact length that is required. To meet these requirements, and to produce a pulse such as the one shown in Fig. 3(a), a pulse shaper is placed in the system as shown in Fig. 1. This pulse shaper may be a circuit such as a monostable multivibrator which is already known in the art. This multivibrator would switch to its unstable condition on receipt of a recorded pulse, and it could switch back either at the end of its own period or on receipt of another recorded pulse. The output of such a pulse shaper will have a waveform such as the one shown in Fig. 3(a).

During the application of the actuating pulse, each oscillator produces a square wave whose equal upper and lower time durations are proportional to the magnitude of the information voltage applied to its input. These waves are recorded on rotating disks. As the recorded waves are carried past the pickup head, they are picked up in succession. They are then converted back to information voltages. In this manner the function of switching is accomplished.

Figure 5:
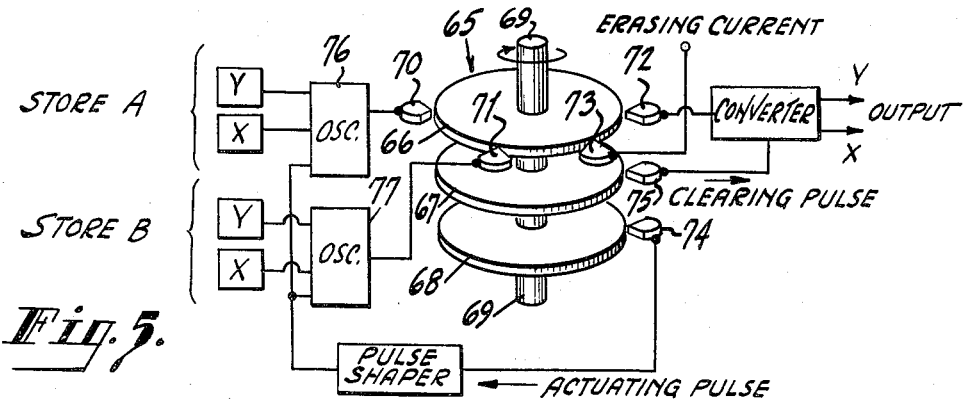
Fig. 5 shows a block diagram of another embodiment of the invention.

While the above-described embodiment has all of the advantages sought in the object of the invention, it has the disadvantage of requiring an oscillator for each component of each information store. While such a disadvantage is not of great consequence in a system having a small number of information stores, it becomes significant in a system having a large number of information stores. Fig. 5 shows another embodiment of the invention whereby this distadvantage is greatly reduced.

In Fig. 5 is shown an information handling system basically the same as the system of Fig. 1. However, the system of Fig. 5 requires only one oscillator for each information store having an X and a Y component, whereas the system of Fig. 1 requires two oscillators for each such store. In Fig. 5, only two information stores A and B, are shown, but it must be remembered that this embodiment is capable of handling a large number of such stores.

The oscillator

Figure 6:
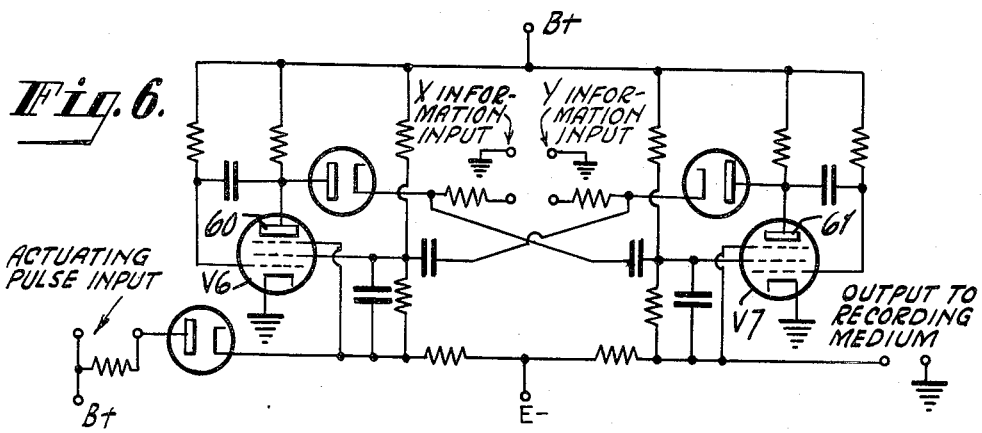
Fig. 6 shows the circuit for one of the oscillators used in Fig. 5.

The circuit diagram for a square-wave oscillator capable of indicating two components of information is shown in Fig. 6. The basic circuit for such an oscillator is identical to the one shown in Fig. 2, with one exception. Instead of having one information input, the oscillator in Fig. 6 has one input for X information and one input for Y information. Thus the voltage appearing on the anode 60 of the pentode $V_6$ may vary independently of the voltage appearing on the anode 61 of the pentode $V_7$. With different voltages appearing on the anodes 60 and 61, the time required for each of the pentodes $V_6$ and $V_7$ to bottom will be different. As in the oscillator of Fig. 2, the time required for the plate 61 of the pentode $V_7$ to bottom determines the time duration of the upper portion of the output wave, and the time required for the plate 60 of the pentode $V_6$ to bottom determines the time duration of the lower portion of the output wave. It is thus possible to produce a rectangular or square wave whose upper and lower time durations are proportional to the Y and X information voltages respectively.

Figure 7:
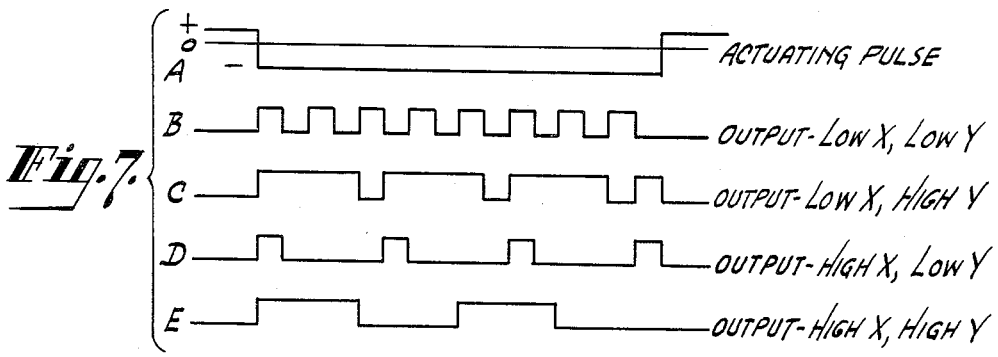
Fig. 7 shows waves representing the operation of the oscillator of Fig. 6.

Various waves representing the operation of the square-wave oscillator of Fig. 6 are shown in Fig. 7. The oscillator is held cut off until it receives an actuating pulse, shown in Fig. 7(a). Fig. 7(b) shows a wave having relatively short upper and lower time durations, indicating that both the Y and the X information voltages are low. Fig. 7(e) shows a wave having relatively long upper and lower time durations, indicating that both the Y and the X information voltages are high. Fig. 7(c) shows a wave having relatively long upper time durations, and relatively short lower time durations, indicating a high Y information voltage and a low X information voltage. And Fig. 7(d) shows a wave having relatively short upper time durations and relatively long lower time durations, indicating a low Y information voltage and a high X information voltage. It will be seen that the period of each cycle of the square waves is varied in response to the information voltage. The outputs of the oscillators are coupled to the recording device 65, shown in Fig. 5.

The recording device

The recording device 65 of Fig. 5 is similar to the recording device 40 shown in Fig. 1. However, instead of separate disks for the X and the Y components, all information is recorded on the one disk 66. Disks 66, 67 and 68 are rigidly fastened to a common shaft 69 which rotates as shown when the device is in operation. The disk 66 is capable of having magnetic recordings made on it by the recording heads 70 and 71. The outputs of the oscillator 76 associated with store A are recorded by the head 70, and the outputs of the oscillator 77 associated with the store B are recorded by the head 71. The recording heads 70 and 71 must be spaced sufficiently far apart so that the recorded output of the oscillator 77 will not pass by the recording head 70 until after the oscillators are cut off at the end of the actuating pulse.

Also associated with the disk 66 is the pickup head 72. This head is coupled to a converter circuit which is shown in Fig. 8. Also associated with the disk 66 is the erasing head 73. This head produces an A.-C. or a D.-C. erasing field from an erasing current so that it removes any previously recorded information from the disk 66 after it passes by the pickup head 72.

After all previously recorded information on the disk 66 has passed by the last recording head 70, the recording device 65 is then ready to record additional information. At this point, another actuating pulse may be simultaneously applied to each of the oscillators. Thus, the cycle of applying an actuating pulse to actuate the oscillators, recording the outputs of the oscillators, and picking up the recorded outputs, may be repeated as often as desired.

The actuating pulse

In the invention, the disk 68 has one or more actuating pulses permanently recorded on it. This disk is fastened to the shaft 69 and rotates at the same speed as the disks 66 and 67. For each revolution of this disk by its pickup head 74, one or more actuating pulses are picked up and coupled to the actuating pulse input of each oscillator, simultaneously turning on each oscillator. The actuating pulse, as recorded and picked up, is neither as constant in amplitude nor as accurate in length as is required. To convert this pulse into the pulse shown in Fig. 7(a), a pulse shaper is placed in the system as shown in Fig. 5. This pulse shaper has the same function and operates in the same manner as the pulse shaper shown in Fig. 1, and previously described in detail with reference to Fig. 1. During the actuating pulse, each oscillator produces a square wave which is recorded on the disk 66. As explained, it is necessary to prevent overlapping of the recorded outputs. With an actuating pulse of fixed duration, this overlapping is prevented by providing sufficient spacing between the recording heads about the disk 66. However, should it be desirable to add more information stores, with their necessary recording heads, the spacing between recording heads becomes limited. This difficulty can be overcome by reducing the time duration of the actuating pulse. Thus for a close spacing between recording heads, overlapping of the recorded outputs can be prevented by reducing the time duration of the actuating pulse so that each oscillator is cut off before the recorded output wave of any oscillator passes by the next recording head. The disk 66 continues to rotate, and the output waves recorded on it are picked up by the pickup head 72 and coupled to the converter for their conversion to Y and X outputs. After the recorded waves have been picked up by the pickup head 72, they are erased so that the disk 66 is ready to record a new set of output waves.

The clearing pulse

The disk 67 has a number of clearing pulses permanently recorded on it. The number of such pulses equals the number of information stores being used in the system. These pulses are positioned on the disk 67 so that one of these pulses passes by the pickup head 75 immediately after each recorded output wave on the disk 66 has passed by the pickup head 72. These pulses are picked up and coupled to the clearing pulse input of the converter. This enables the converter to be cleared after receiving an output wave from one store so as to be ready to receive an output wave from the next store.

The converter

The circuit for the converter is shown in Fig. 8 and the waves associated with the converter circuit are shown in Fig 9. Sources of positive D.-C. voltages are shown as B+, and sources of negative D.-C. voltages are shown as E—. Though a method is not shown, the cathodes of the various tubes may be heated indirectly. The tubes V10 and V11 form multivibrator 1, the tubes V12 and V13 form multivibrator 2, and the tubes V14 and V15 form multivibrator 3, each of the multivibrators being enclosed by dashed lines. Each of these multibrators is a bistable multivibrator which is known in the art. In such multivibrators, one of the tubes is conducting, and will continue to conduct until the multivibrator is switched, at which time the conducting tube is cut off, and the other tube begins to conduct. The multivibrator will remain in that condition until it is switched again. The tubes V16 and V17 serve as control tubes for the circuit. They are connected so that the voltages on their screen grids 80 and 81 respectively, and the voltages at the input or on their control grids, 82 and 83 respectively, must be above some predetermined value before current can flow through the tubes. The tube V18 serves as an inverter tube. Its control grid 84 is connected to a positive voltage source B+ through a resistor 85 so that current is usually flowing to the anode 86 of the tube V18. When a pulse appears at the information input, it is coupled to the control grid 84 by the capacitor 87 and the resistor 88. If the pulse is positive, it has no significant effect since anode current is already flowing through the tube V18, and the voltage of its anode 86 is near its lowest value. If the pulse is negative, however, it will lower the voltage on the grid 84, which will lower the amount of anode current flowing through the tube V18, thus raising the anode voltage. The tubes V19, V20, and V21 serve as restorer tubes for the circuit and are normally biased beyond cutoff through a resistor 90. The tubes V22 and V23 serve as output tubes for the converter circuit and are normally biased beyond cutoff through resistors 91 and 92. However, when a positive pulse is applied to their suppressor grids 93 and 94, a current, independent of the anode voltage applied to the tube, will flow. The tube V24 by-passes to B+ the positive pulse of current resulting from the charging of the capacitor 95 and the stray capacity of tube V25. The diodes V25, V26, V27, and V28 serve as isolation tubes in that they allow current flow in one direction only.

Briefly, the converter operates as follows: After receiving one train of pulses, the converter is cleared by the clearing pulse. After the converter has been cleared, the output capacitors 96 and 97 are charged to the voltage B+ as shown after the time T4 in the waveforms of Figs. 9(n) and 9(o). The tubes V11, V13, and V15 of the multivibrators are then conducting. At the time T1, the first pulse of a new train of pulses switches the multivibrator 1. At the time T2, the second pulse of the same train switches the multivibrator 1 back to its original condition, which in turn switches the multivibrators 2 and 3. At the time T3, the third pulse of the same train switches the multivibrator 2 back to its original condition. The converter then becomes insensitive to any further pulses of that same train. Thus during any one train of pulses, the multivibrator 1 is switched from the time T1 to T2, and the multivibrator 2 is switched from the time T2 to T3. During the time that the multivibrators 1 and 2 are switched, they permit the output capacitors 96 and 97 to discharge. Since these capacitors discharge at a fixed rate, the amount that they discharge is determined by the time the multivibrators 1 and 2 are switched, which in turn is determined by the time duration of the upper and lower portions of the original output square wave. Thus the original value of the Y and the X components in an information store are regained and separated.

A detailed description of the circuit follows: After the converter circuit has received a clearing pulse, the tubes V11, V13, and V15 of the multivibrators are conducting. The voltage on the anode 100 of the tube V13 and consequently the voltage on the screen grid 81 of the tube V17 are sufficiently low to hold the tube V17 cut off even when a positive pulse is applied to its control grid 83. As explained, the tubes V16 and V17 are connected so that both their screen voltage and control grid voltage must be above some predetermined value before current can flow through the tubes. Conversely, because the tube V14 is not conducting, the voltage on its anode 101 and the voltage on the screen grid 80 of the tube V16 are relatively high. The tube V16 is held in a cutoff condition only by the high negative bias voltage applied to its control grid 82 through the resistor 102. The output capacitors 96 and 97 are charged, and their voltages are equal to B+. When in the condition just described, the converter circuit is ready to convert a new train of pulses.

As an example, a store of information having a high X component of information and a low Y component of information will be assumed. The oscillator output for such an example is represented by the rectangular or square wave in Fig. 9(a) and also in Fig. 7(d). After being recorded and picked up, this wave becomes a train of pulses which have the form shown in Fig. 9(b) because of the characteristics of a magnetic recording device. This train of pulses appears at the information input of the converter, and is the signal on which the converter circuit must operate.

Since the voltage on the screen grid 80 of the tube V16 is at its upper positive limit, the positive pulse applied to the input at time T1 and coupled through the capacitor 103 to the grid 82, will cause anode current to flow in the tube V16. As explained, the voltage on the anode 86 of the tube V18 is substantially unaffected by a positive pulse. When the tube V16 conducts, its anode voltage will drop and this drop in voltage will pass through the diode V27 and appear on the anode 104 of the tube V10. The drop in the voltage on the anode 104 will cause the multivibrator 1 to switch so that the tube V10 conducts and the tube V11 is cut off. This switch at time T1, as reflected by the anode voltages on the tubes V16, V10, and V11, is shown in Figs. 9(c), 9(d), and 9(e). At the time T2, a second pulse is applied to the converted input. This pulse is negative. When applied to the control grid 84 of the tube V18, this negative pulse causes the voltage on the anode 86 to rise, as shown in Fig. 9(f). This rise in anode voltage passes through the diode V26 and causes the multivibrator 1 to return to its original condition in which the tube V11 conducts and the tube V10 is cut off.

When the tube V11 stopped conducting, the rising voltage on its anode 105 drives a pulse of current through the capacitor 95, but this pulse is diverted through the diode V24 to the source B+. When the tube V11 begins conducting again, its anode voltage will drop. This drop in voltage will pass through the capacitor 95 and the diode V25, and appear on the anode 106 of the tube V12. This same voltage drop will also pass through the diode V28 and appear on the anode 101 of the tube V14. The drop in voltage on the anode 106 will cause the multivibrator 2 to switch so that the tube V13 is cut off and the tube V12 conducts. The drop in the voltage on the anode 101 will cause the multivibrator 3 to switch so that the tube V15 is cut off and the tube V14 conducts. The changes in anode voltages for the multivibrator 2 and the changes in anode voltages for the multivibrator 3 are shown in Figs. 9(g), (h), (j), and (k). The drop in voltage on the anode 101 causes the voltage on the screen grid 80 of the tube V16 to drop so that tube V16 remains cut off even if a positice pulse is thereafter applied to its control grid 82. Conversely, the rise in voltage on the anode 100 causes the voltage on the screen grid 81 of the tube V17 to rise so that the tube V17 is held cut off only by the bias applied through the resistor 102. It can conduct when a positive pulse is applied to its control grid 83.

When the next positive pulse appears at the input at time T3, the anode 107 of the tube V17 will draw a pulse of current I, shown in Fig. 9(m). This pulse of anode current will cause the voltage on the anode 100 of the tube V13 to drop, thus causing the multivibrator 2 to return to its original condition with the tube V13 conducting and the tube V12 cut off. When the tube V13 conducts again, its anode voltage drops, causing the voltage on the screen grid 81 of the tube V17 to drop also. Thus the tube V17 becomes insensitive to further pulses applied to its control grid 83. The diode V24 prevents any rise in voltage on the anode 106 of the tube V12, which may be coupled through the tube V25, from appearing at the anode 105 of the tube V11, so that multivibrator 1 is unaffected by any change in the voltage conditions of multivibrator 2.

When the time T3 is reached, the multivibrator 1 has been switched for the time from T1 to T2 and the multibrator 2 has been switched for the time from T2 to T3. However, the multivibrator 3 was switched at the time T2, and it remains switched until a clearing pulse is received. Consequently after the time T3, the original condition of the multivibrator 2 and the switched condition of the multivibrator 3 cause the voltages on the screen grids 81 and 80 to hold the tubes V17 and V16 respectively in a cut off condition and render the tubes insensitive to a positive pulse applied to their control grids 83 and 82. The voltages on the screen grids 81 and 80 are shown in Figs. 9(i) and (l). Thus, the circuit will not respond to any positive pulse applied to the input until the circuit has been cleared. Since the tube V11 is already conducting, a negative pulse applied to the input and to the grid 84 of the tube V18 has no effect on the converter. The pulse of anode current I in the tube V17 can be used to indicate that the information contained in the train of pulses has now been utilized by the converter circuit. This same pulse of current can also be used as a clearing pulse if it is given a slight time delay. This would eliminate the need of the recorded clearing pulses.

When the multivibrator 1 was switched, the rise in the voltage on the anode 105 of the tube V11 passed through the capacitor 110 and appeared on the suppressor grid 93 of the tube V22, which then became sufficiently positive to allow current to flow in this tube. Since this anode current was derived from the charge on the capacitor 96, the charge and the voltage on the capacitor 96 were reduced during the time from T1 to T2. When the multivibrator 1 was restored to its original condition, the anode current in the tube V22 ceases to flow, thus fixing the charge and the voltage on the capacitor 96. Similarly, when the multivibrator 2 was switched, the rise in the voltage on the anode 100 of the tube V13 passed through the capacitor 111 and appeared on the suppressor grid 94 of the tube V23, which then became sufficiently positive to allow anode current to flow in this tube. Since this anode current was derived from the charge on the capacitor 97, the charge and the voltage on the capacitor 97 was reduced during the time from T2 to T3. When the multivibrator 2 was restored to its original condition, the anode current in the tube V23 ceased to flow, thus fixing the charge and the voltage on the capacitor 97. These voltages are shown in Figs. 9(n) and (o) and it will be seen that the difference between B+ and their final value indicates the low Y input and the high X input that was selected as an illustration.

As previously explained, a clearing pulse must be applied to the clearing pulse input of the converter circuit before the converter circuit can receive a new train of pulses at its input. This clearing pulse, obtained from the disk 67 or from the current pulse I after being delayed, may be applied at any time after the time T3, as far as the converter circuit is concerned. However, the reduced charges and voltages on the output capacitors 96 and 97 must persist for a sufficient length of time to allow the operation of any equipment that follows and depends upon the output voltages of the converter. If the pulse is magnetically recorded, it will appear as shown in Fig. 9(p). However, only the positive portion of the pulse is needed. When applied to its input, this pulse passes through the capacitor 112 and causes the control grids 113, 114, and 115 to become less negative. Anode current then flows through the tubes V19, V20, and V21. The flow of anode current in the tubes V21 and V20 recharges the output capacitors 96 and 97. The flow of anode current in the tube V19 causes the voltage on the anode 116 of the tube V15 to drop, thus returning the multivibrator 3 to its original condition of the tube V15 conducting and the tube V14 cut off. With the tube V14 in a cutoff condition, the voltage on its anode 101 and the voltage on the screen grid 80 of the tube V16 will be at a relatively high value. Thus the tube V16 again becomes sensitive to a positive input pulse applied to its control grid 82. In this condition, the circuit is then ready to receive the next train of pulses. When the next train is received the converter circuit goes through the same cycle as has just been described. It will be understood that the circuit goes through a similar cycle for each train of pulses received.

The invention claimed is:

1. In an information handling system, the combination of a normally quiescent square wave oscillator having a first input and a second input, said oscillator being responsive to an actuating pulse applied to said first input for producing a plurality of square waves during said actuating pulse and being responsive to information applied to said second input for varying the period of each cycle of said square waves, means coupled to said oscillator for recording said square waves, and means coupled to said recording means for converting said recorded square waves to direct current signals.

2. In a system for sampling information from a plurality of sources and switching said information to a common load, the combination of a normally quiescent oscillator for producing substantially square waves, said oscillator having an actuating pulse input and an information input, and being responsive to an actuating pulse applied to said actuating pulse input for producing a plurality of square waves during said actuating pulse, and being responsive to information applied to said information input for varying the period of each cycle of said square waves, an output connected to said oscillator, recording means coupled to said output for recording said square waves, and means coupled to said recording means for converting the square waves recorded on said recording means to direct current signals.

3. An information handling system for switching information from a plurality of information stores into a common load, each of said stores representing a first component of information and a second component of information by separate D.-C. voltages, comprising a plurality of normally quiescent square wave oscillators each having a first input and a second input, each of said oscillators being responsive to an actuating pulse applied to said first input for producing a plurality of square waves during said actuating pulse, and each of said oscillators being responsive to information applied to said second input for varying the time duration of the upper portions and the lower portions of said square waves by the same amount, a separate output coupled to each of said oscillators, means for coupling each of said information components individually to one of the second inputs of said oscillators, means for applying an actuating pulse to the first input of each of said oscillators, means coupled to each of said outputs for recording said square waves, and means for converting said recorded waves to direct current signals.

4. An information handling system comprising a normally quiescent square wave oscillator having a first input and a second input, said oscillator being responsive to an actuating pulse applied to said first input for producing a plurality of square waves during said actuating pulse and being responsive to said information applied to said second input for varying the period of each cycle of said square waves, an output coupled to said oscillator, a magnetic recording device for recording said square waves, said recording device having a first disk on which magnetic recordings can be made fastened to a rotatable shaft, a recording head, a first pickup head, an erasing head, said heads being positioned around the edge of said first disk, a second disk having an actuating pulse recorded thereon fastened to said shaft, a second pickup head positioned at the edge of said second disk, means coupling said recording head to said output, means converting said recorded waves to direct current signals, means coupling said first pickup head to said converting means, means coupling an erasing current to said erasing head, means coupling said second pickup head to said first input, and means for applying information to said second input.

5. An information handling system comprising a normally quiescent square wave oscillator having a first input and a second input, said oscillator being responsive to an actuating pulse applied to said first input for producing a plurality of square waves during said actuating pulse and being responsive to information applied to said second input for varying the period of each cycle of said square waves, an output coupled to said oscillator, a magnetic recording device for recording said square waves, said recording device having a first disk on which magnetic recordings can be made fastened to a rotatable shaft, a recording head, a first pickup head, and an erasing head positioned around the edge of said first disk, a second disk having an actuating pulse recorded thereon fastened to said shaft, a second pickup head positioned at the edge of said second disk, means coupling said recording head to said output, means coupled to said first pickup head for converting said recorded waves to direct current signals, said converting means including means for clearing said converting means in response to a clearing pulse applied thereto and thereby permit said converting means to convert additional recorded waves, means coupled to said converting means for supplying a clearing pulse thereto after said converting means converts a recorded wave to a direct current signal and before an additional recorded wave is coupled to said converting means, means coupling said first pickup head to said converting means, means coupling an erasing current to said erasing head, means coupling said second pickup head to said first input, and means for applying information to said second input.

6. An information handling system as claimed in claim 5, wherein said means for supplying said clearing pulse comprises a third disk having a clearing pulse recorded thereon fastened to said rotatable shaft, a third pickup head, and means coupling said third pickup head to said converting means, said third pickup head being positioned at the edge of said third disk so that said clearing pulse recorded on said third disk is coupled to said converting means after said converting means converts a recorded wave to a direct current signal and before an additional recorded wave is coupled to said converting means.

7. An information handling system for switching a plurality of informations into a common load, comprising a normally quiescent square wave oscillator having an actuating pulse input and a pair of information inputs, said oscillator being responsive to an actuating pulse applied to said actuating pulse input for producing a plurality of square waves during said actuating pulse and being responsive to information applied to one of said information inputs for varying the time duration of the upper portions of said square waves and being responsive to information applied to the other of said information inputs for varying the time duration of the lower portions of said square waves, an output coupled to said oscillator, means for coupling said informations to said pair of information inputs, means coupled to said output for recording said square waves, means coupled to said recording means for converting said recorded waves to direct current signals, and means operative with said recording means for coupling an actuating pulse to said actuating pulse input.

8. An information handling system for switching a plurality of informations into a common load, comprising a plurality of normally quiescent square wave oscillators each having a first input and a second input, each of said oscillators being responsive to an actuating pulse applied to said first input for producing a plurality of square waves during said actuating pulse, and each of said oscillators being responsive to information applied to said second input for varying the period of each cycle of said square waves, a separate output coupled to each of said oscillators, means coupling said informations individually to each of the second inputs of said oscillators, magnetic recording means having a recording medium, a plurality of recording heads positioned to record on said recording medium, a pickup head positioned to pick up waves recorded on said recording medium, means coupling each of said outputs individually to one of said recording heads, means coupled to said pickup head for converting said recorded waves to direct current signals, and means operative with said recording means for simultaneously applying an actuating pulse to the first input of each of said oscillators.

9. An information handling system for repetitively switching a plurality of informations into a common load, comprising a plurality of normally quiescent square wave oscillators each having an input for an actuating pulse and an input for information, each of said oscillators being responsive to an actuating pulse applied to said actuating pulse input for simultaneously producing a plurality of square waves during said actuating pulse, and each of said oscillators being responsive to information applied to said information input for varying the period of each cycle of said square waves, a separate output coupled to each of said oscillators, means individually coupling said informations to each of the information inputs of said oscillators, magnetic recording means having a recording medium, a plurality of recording heads positioned to record on said recording medium, a pickup head positioned to pick up said square waves recorded on said recording medium, means coupling each of said outputs to one of said recording heads, means coupled to said pickup head for sequentially converting said recorded square waves to direct current signals, and means operative with said recording means for repetitively and simultaneously applying an actuating pulse to each of the actuating pulse inputs of said oscillators after all previously recorded square waves have passed by all of said recording heads.

10. An information handling system for switching a plurality of informations from information stores, each having a pair of information components, into a common load, comprising a plurality of normally quiescent square wave oscillators each having an actuating pulse input and a pair of inputs for information components, each of said oscillators being responsive to an actuating pulse applied to said actuating pulse input for simultaneously producing a plurality of square waves during said actuating pulse, and each of said oscillators being responsive to information applied to one of said information component inputs for varying the time duration of the upper portions of said square waves and being responsive to information applied to the other of said information component inputs for varying the time duration of the lower portions of said square waves, a separate output coupled to each of said oscillators, means coupling each of said pairs of information components individually to the pair of information component inputs of one of said oscillators, magnetic recording means having a recording medium, a plurality of recording heads each coupled to one of said oscillator outputs and positioned to record said square waves on said recording medium, a pickup head positioned to pick up said recorded waves from said recording medium, means coupled to said pickup head for converting said recorded waves picked up by said pickup head to direct current signals and for separating said direct current signals into their original components of information, means for clearing said converting means after said converting means converts a recorded wave to a direct current signal and before a second recorded wave is picked up by said pickup head and coupled to said converting means, and means operative with said recording means for simultaneously applying an actuating pulse to each of the actuating pulse inputs of said oscillators.

11. An information handling system for repetitively switching a plurality of informations from information stores, each having a pair of information components, into a common load, comprising a plurality of normally quiescent square wave oscillators each having an actuating pulse input and a pair of inputs for information components, each of said oscillators being responsive to an actuating pulse applied to each of the actuating pulse inputs of said oscillators for simultaneously producing a plurality of square waves during said actuating pulse, and each of said oscillators being responsive to information applied to one of said information component inputs for varying the time duration of the upper portions of said square waves and being responsive to information applied to the other of said information component inputs for varying the time duration of the lower portions of said square waves, a separate output coupled to each of said oscillators, means coupling each of said pairs of information components individually to the pair of information component inputs of one of said oscillators, magnetic recording means having a recording medium, a plurality of recording heads each coupled to one of said oscillator outputs and positioned to record said square waves on said recording medium, a pickup head positioned to pick up said recorded waves from said recording medium, means coupled to said pickup head for sequentially converting said recorded waves picked up by said pickup head to direct current signals and for separating said direct current signals into their original components of information, means for clearing said converting means after said converting means converts a recorded wave to a direct current signal and before a second recorded wave is picked up by said pickup head and coupled to said converting means, and means operative with said recording means for repetitively applying an actuating pulse to each of the actuating pulse inputs of said oscillators after all previously recorded output waves have passed by all of said recorded heads.

12. An information handling system for sequentially switching a plurality of informations from information stores, each having a first component and a second component of information, into a common load, in which all first components of information are separated from all second components of information, comprising a plurality of normally quiescent square wave oscillators each having an input for an actuating pulse and an input for an information component, each of said oscillators being responsive to an actuating pulse applied to said actuating pulse input for simultaneously producing a plurality of square waves during said actuating pulse, and each of said oscillators being responsive to information applied to said information component input for varying the time duration of the upper portions and the lower portions of said square waves by the same amount, a separate output coupled to each of said oscillators, means coupling each of said information components individually to the information component inputs of one of said oscillators, magnetic recording means for recording said square waves including a first and second magnetic recording medium having a synchronized and cyclic operation, a plurality of recording heads positioned about each of said recording mediums for recording thereon, a first pickup head positioned to pick up said recorded square waves for said first medium, a second pickup head positioned to pick up said recorded square waves from said second medium, means coupling each output of said oscillators having a first information component coupled to their information component inputs to one of said recording heads positioned about said first medium, means coupling each output of said oscillators having a second information component coupled to their information component inputs to one of said recording heads positioned about said second medium, a first and a second converter coupled to said first and second pickup heads respectively for sequentially converting the recorded square waves picked up by said first and second pickup heads to first and second direct current signals respectively, and means synchronized with said recording means for simultaneously applying an actuating pulse of predetermined duration to each of the actuating pulse inputs of said oscillators for each cycle of operation of said recording means.

13. An information handling system for sequentially switching a plurality of information from information stores, each having first components and second components of information, into a common load, in which all first components of information are separated from all second components of information, comprising a plurality of normally quiescent square wave oscillators, each having an actuating pulse input and a first and second information component input, each of said oscillators being responsive to an actuating pulse applied to said actuating pulse input for simultaneously producing a plurality of square waves during said actuating pulse, and each of said oscillators being responsive to information applied to said first information component inputs for varying the time duration of the upper portions of said square waves and each of said oscillators being responsive to information applied to said second information component inputs for varying the time duration of the lower portions of said square waves, a separate output coupled to each of said oscillators, means coupling each of said first components and each of said second components of information individually to the first information component input of one of said oscillators and to the second information component input of one of said oscillators respectively, magnetic recording means for recording said square waves having a magnetic recording medium that has a cyclic operation, a plurality of recording heads coupled to said oscillator outputs and positioned about said recording medium for recording said square waves on said medium, a pickup head positioned to pick up said recorded waves from said recording medium, a converter circuit coupled to said pickup head for sequentially converting said recorded waves picked up by said pickup head to direct current signals, said converter having an input for a clearing pulse, means coupled to said clearing pulse input to render said converter receptive to additional recorded waves in response to a clearing pulse applied to said clearing pulse input, means for coupling a clearing pulse to said clearing pulse input after said converter converts a recorded wave to a direct current signal and before an additional recorded wave is coupled to said converter, and means synchronized with said recording means for applying an actuating pulse of predetermined duration to each of the actuating pulse inputs of said oscillators for each cycle of operation of said recording means.

14. In a converter circuit for converting trains of alternately positive and negative pulses, each train having a first time duration between each positive pulse and its successive negative pulse and a second time duration between each negative pulse and its successive positive pulse, into a first direct current signal proportional to said first time duration and a separate second direct current signal proportional to said second time duration, the combination of an input for said trains of pulses, an input for clearing said converter circuit so that it may convert additional trains of pulses when a clearing pulse is applied to said clearing input, means rendering said converter sensitive to said trains applied to said input for one of said first time durations and for one of said second time durations, means rendering said converter circuit insensitive to said trains after said second time duration until a clearing pulse is applied to said converter, means for producing a first direct current signal at a first output proportional to said first time duration and for producing a second direct current signal at a second output proportional to said second time duration, and means for coupling a clearing pulse to said clearing input after said second time duration and before additional trains of pulses are applied to said input.

15. In a converter circuit for converting a train of alternately positive and negative pulses having a first time duration between each positive pulse and its successive negative pulse and a second time duration between each negative pulse and its successive positive pulse into a first direct current signal proportional to said first time duration and a separate second direct current signal proportional to said second time duration, the combination of an input for said train of pulses, first and second control circuits for rendering said converter circuit insensitive to said train of pulses after the second positive pulse of said train is applied to said input, means coupling said input to said control circuits, a first bistable multivibrator circuit, a second bistable multivibrator circuit, and a third bistable multivibrator circuit, each of said multivibrator circuits having a tube originally conducting and a tube originally cut off, means coupling said first control circuit to said first multivibrator for switching said first multivibrator when the first positive pulse is applied to said input, means coupling said input to said first multivibrator for restoring said first multivibrator to its original condition when the first negative pulse, following said first positive pulse, is applied to said input, means coupling the originally conducting tube of said first multivibrator to said second multivibrator and to said third multivibrator for switching said second and third multivibrators when said first multivibrator is restored to its original condition, means coupling said second control circuit to said second multivibrator for restoring said second multivibrator to its original condition when the second positive pulse is applied to said input, means coupling the originally cut off tube of said third multivibrator to said first control circuit for rendering said first control circuit sensitive to said train of pulses when said third multivibrator is in its original condition and insensitive to said train of pulses when said third multivibrator is switched, means coupling the originally conducting tube of said second multivibrator to said second control circuit for rendering said second control circuit sensitive to said train of pulses when said second multivibrator is switched and insensitive to said train of pulses when said second multivibrator is in its original condition, a first output circuit, a second output circuit, means coupling the originally conducting tube of said first multivibrator circuit to said first output circuit for producing a voltage change across said first output circuit that is proportional to the time during which said first multivibrator is switched, means coupling the originally conducting tube of said second multivibrator to said second output circuit for producing a voltage change across said second output circuit that is proportional to the time during which said second multivibrator is switched, an input for clearing said converter circuit so that it may convert additional trains of pulses when a clearing pulse is applied to said clearing input, a first restorer circuit, a second restorer circuit, and a third restorer circuit, means for coupling said clearing input to each of said restorer circuits, means coupling said first restorer circuit to said first output circuit for restoring said first output circuit to its original voltage condition when a clearing pulse is applied to said clearing pulse input, means coupling said second restorer circuit to said second output circuit for restoring said second output circuit to its original voltage condition when a clearing pulse is applied to said clearing pulse input, and means coupling said third restorer circuit to said third multivibrator for restoring said third multivibrator to its original condition when a clearing pulse is applied to said clearing pulse input.

16. In an information handling system, the combination of a normally quiescent square wave oscillator being a first input and a second input, said oscillator being responsive to an actuating pulse applied to said first input for producing a plurality of square waves during said actuating pulse and being responsive to information applied to said second input for varying the time duration of the upper portions and the lower portions of said square waves in the same direction, an output coupled to said oscillator, means coupled to said output for recording said square waves, and means coupled to said recording means for converting said recorded square waves to direct current signals.

17. In an information handling system, the combination of a normally quiescent square wave oscillator having a first input and a second input, said oscillator being responsive to an actuating pulse applied to said first input for producing a plurality of square waves during said actuating pulse and being responsive to said information applied to said second input for increasing the time duration of the upper portions of said square waves without decreasing the time duration of the lower portions of said square waves, an output coupled to said oscillator, means coupled to said output for recording said square waves, and means coupled to said recording means for converting said recorded waves to direct current signals.

18. The handling system as defined in claim 7, wherein said converting means comprises a circuit for converting trains of alternately positive and negative pulses, each train having a first time duration between each positive pulse and its successive negative pulse and a second time duration between each negative pulse and its successive positive pulse, into a first direct current signal proportional to said first time duration and a separate second direction current signal proportional to said second time duration, an input for said trains of pulses, an input for clearing said converter circuit so that it may convert additional trains of pulses when a clearing pulse is applied to said clearing input, means rendering said converter circuit sensitive to said trains applied to said input for one of said first time durations and for one of said second time durations, means rendering said converter insensitive to said trains after said second time duration until a clearing pulse is applied to said converter, means for producing a first direct current signal at a first output proportional to said first time duration and for producing a second direct current signal at a second output proportional to said second time duration, and means for coupling a clearing pulse to said clearing input after said second time duration and before additional trains of pulses are applied to said input.

19. The information handling system as defined in claim 10, wherein said converting means comprises a circuit for converting trains of alternately positive and negative pulses, each train having a first time duration between each positive pulse and its successive negative pulse and a second time duration between each negative pulse and its successive positive pulse, into a first direct current signal proportional to said first time duration and a separate second direct current signal proportional to said second time duration, an input for said trains of pulses, an input for clearing said converter circuit so that it may convert additional trains of pulses when a clearing pulse is applied to said clearing input, means rendering said converter circuit sensitive to said trains applied to said input for one of said first time durations and for one of said second time durations, means rendering said converter insensitive to said trains after said second time duration until a clearing pulse is applied to said converter, means for producing a first direct current signal at a first output proportional to said first time duration and for producing a second current signal at a second output proportional to said second time duration, and means for coupling a clearing pulse to said clearing input after said second time duration and before additional trains of pulses are applied to said input.

References Cited in the file of this patent
UNITED STATES PATENTS

| | | |
|---|---|---|
| 2,380,520 | Hassler | July 31, 1945 |
| 2,468,703 | Hammel | Apr. 26, 1949 |
| 2,540,654 | Cohen et al. | Feb. 6, 1951 |